Figure 1:
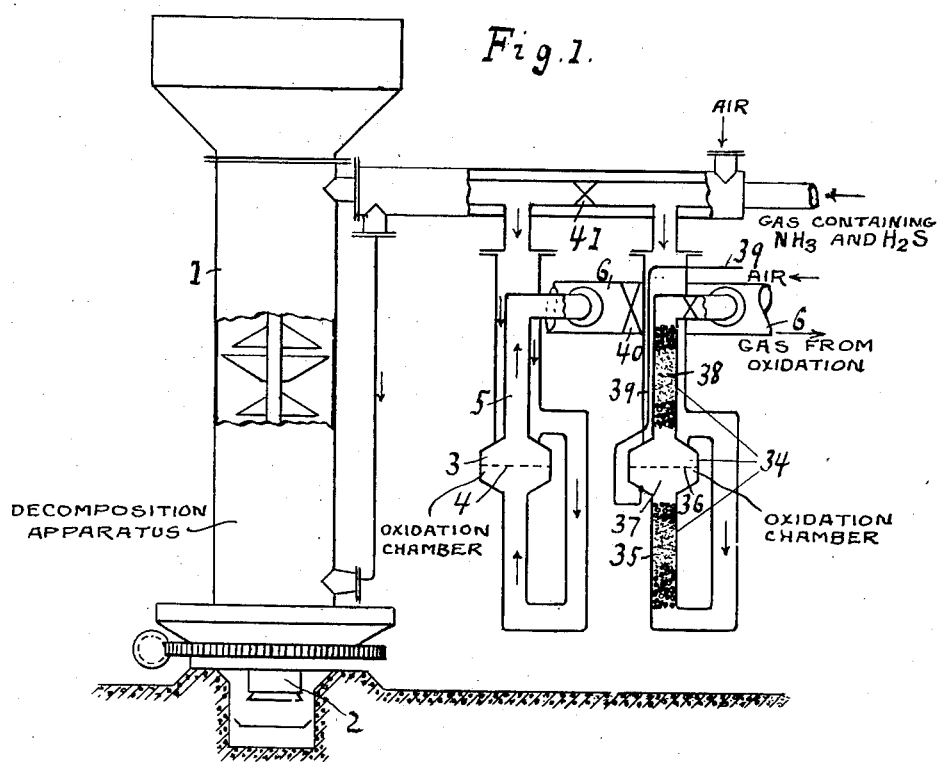
Figure 3:
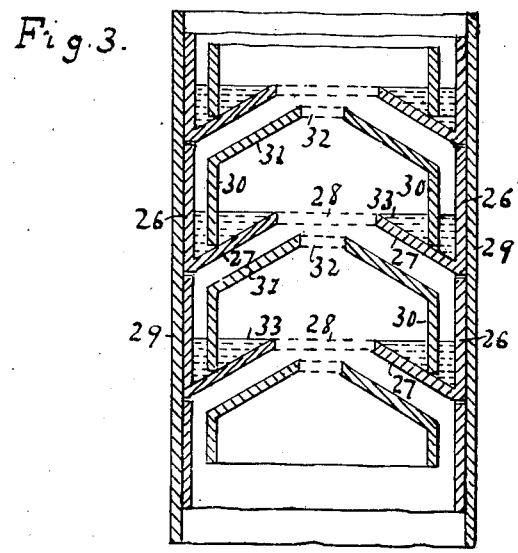

July 26, 1932.   H. BÄHR   1,868,868

PRODUCTION OF NITRIC AND SULPHURIC ACID

Filed Jan. 21, 1928   2 Sheets-Sheet 1

INVENTOR
Hans Bähr
BY
ATTORNEYS

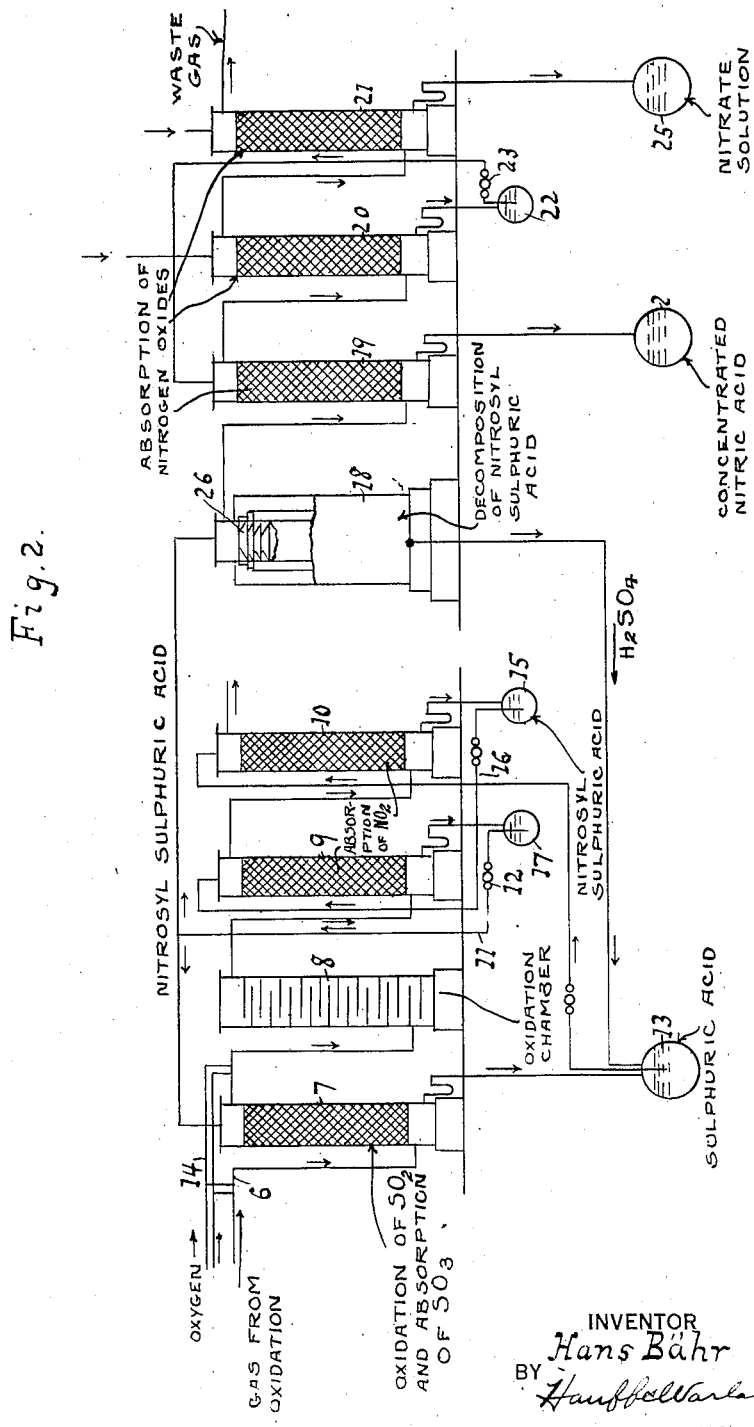

Patented July 26, 1932

1,868,868

UNITED STATES PATENT OFFICE

HANS BÄHR, OF LUDWIGSHAFEN-ON-THE-RHINE, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

PRODUCTION OF NITRIC AND SULPHURIC ACID

Application filed January 21, 1928, Serial No. 248,506, and in Germany May 22, 1926.

Applications have been filed in Germany on May 22, 1926, November 27, 1926, December 18, 1928, April 25, 1927, April 27, 1927, April 30, 1927, and in France on December 17, 1927.

The present invention relates to the production of nitric acid and sulphuric acid which, hitherto, has generally been performed in a separate plant for each of the said acids.

I have found that nitric acid and sulphuric acid and their salts can be obtained together in a single process if mixtures of gases containing ammonia and volatile compounds of sulphur such as sulphur oxids or hydrogen sulphid are passed at elevated temperatures such as are usual for the catalytic oxidation of ammonia over oxidizing catalysts after adding oxygen or gases containing the same, so that oxids of nitrogen and of sulphur are produced which may easily be converted into other products such as sulphuric acid and nitric acid or their salts. Especially the mixtures of gases recovered from the washing media employed for washing industrial gases, for example the gases obtained by heating ammonium sulphite or mixtures of ammonium salts obtained in washing illuminating gas or suitable as initial materials. When employing as initial material gas mixtures containing ammonia and hydrogen sulphid with or without cyanogen compounds or other substances which might poison the catalysts for the combustion of the ammonia, such gas is preferably pretreated by mixing it with oxygen or gases containing the same in an amount sufficient at least for the oxidation of the hydrogen sulphid and other poisonous constituents into sulphur oxids and other innocuous products and passing the resulting mixture at about from 250° to 350° C. over an oxidizing catalyst consisting of metals or compounds of the same suitable for this oxidation such as nickel, iron, cobalt, copper, lead, or their salts or oxids or mixtures thereof with each other or with other materials, as for example carriers, or activators such as molybdenum, tungsten, cerium, thorium or antimony or mixtures or compounds thereof. In the said operation the hydrogen sulphid is converted into sulphurous acid or sulphur trioxid or both and cyanogen compounds, if such be present, are simultaneously converted into ammonia and oxids of carbon.

In order to convert the ammonia contained in the gases, whether these have been subjected to the aforesaid preliminary treatment or not, into oxids of nitrogen, the gases are subjected to catalytic oxidation in the manner usual for this reaction. If desired, a special catalytic oxidation of sulphurous acid to sulphur trioxid may be applied before or after the combustion of the ammonia, for example, by passing the gases containing ammonia or nitrogen oxids and sulphurous acid with an admixture of oxygen or gases containing the same over an oxidizing catalyst. The temperatures suitable for this operation range between 500° and 850° C.

The gas mixtures obtained by any of the manners of working described above and containing oxids of nitrogen and of sulphur are then converted into sulphuric acid; this may be effected by subjecting the gases to further oxidation converting the said oxids into nitrogen dioxid and sulphur trioxid, for example by keeping the gas sufficiently long in contact with oxygen or gases containing oxygen and passing the gases then through a scrubbing tower fed with concentrated sulphuric acid.

Or the gases containing oxids of nitrogen and of sulphur are directly fed into a scrubbing tower supplied with nitrosyl sulphuric acid. In this tower through which the gases may pass in the same direction as the nitrosylsulphuric acid or in a countercurrent thereto, the sulphurous acid is oxidized into sulphur trioxid by means of the nitrosylsulphuric acid and is dissolved as is also any sulphur trioxid originally present in the gas. The amount of heat usually contained in the introduced gases will completely decompose the nitrosylsulphuric acid into sulphuric acid and nitrogen oxids whereby the former is concentrated and may be run off at the bottom of the tower. The gases flowing from the said tower are treated with oxygen or gases containing the same, for example by slowly passing them through an oxidation chamber, in order to oxidize the nitrogen oxids, and led to a scrubbing tower fed with sulphuric acid thus extracting the nitrogen dioxid.

As pointed out above, particularly suitable initial gas mixtures for the process according to the present invention are those obtained by heating ammonium sulphite or mixtures containing the same. This is chiefly due to the fact that in this case the operation differs from the well known lead chamber process by the differing proportion of nitrogen oxids and sulphur oxids, the amount of the former being so high in the present case as to obtain nearly complete oxidation of the sulphur dioxid into trioxid in a very short time so that only one absorption tower is required therefor, whilst in the lead chamber process the amount of nitrogen oxid in proportion to that of sulphur dioxid present is so low that even when each molecule of nitrogen dioxid parts with its available oxygen, it must be regenerated by oxygen for producing a complete oxidation of the sulphurous acid.

The nitrosylsulphuric acid obtained in the last mentioned stage of the present process, that is the absorption of nitrogen dioxid by sulphuric acid and not wanted for supply to the aforesaid scrubbing tower, is diluted, if desired, and decomposed by heat in any known or suitable manner, so that concentrated sulphuric acid and nitrogen oxids are obtained, the latter in a highly concentrated state which allows of converting the same into nitric acid without any difficulty by the usual methods.

The nature of this invention will be further illustrated by the following examples, reference being made to the accompanying diagrammatic drawings, but the invention is not restricted to these examples.

*Example 1*

In the plant illustrated by Figure 1, a mixture of ammonium salts obtained by purifying illuminating gas and consisting of about 85 per cent of ammonium sulphite and 15 per cent of ammonium sulphate, is heated to from 130° to 150° C. in a decomposing apparatus 1 of any suitable construction by means of a current of hot air; the resulting mixture of gases contains about 8 per cent of free ammonia. The ammonium sulphate present is not decomposed at the said temperatures and is collected in the lower part 2 of the decomposing apparatus from which it may be drawn off. The said hot mixture of gases is now fed into a combustion chamber 3 after being heated to about 300° to 400° C. by the reaction gases flowing through a pipe 5 from the said chamber 3 and the ammonia contained therein is oxidized to nitrogen oxid at about from 600 to 700° C. by a catalyst 4 which may consist of platinum gauze (3000 meshes/cm²) but may also be substituted by other catalysts suitable for this purpose as for example iron with additions of tellurium and bismuth.

The hot products of this oxidation pass through pipes 5 and 6 and are introduced from below into an absorption tower 7 (see Fig. II) in countercurrent to nitrosylsulphuric acid supplied from above, most of the heat of the gases being communicated to the acid and decomposing it into sulphuric acid and nitrogen oxids, which simultaneously convert all or part of the sulphur dioxid into trioxid, the latter being absorbed by the concentrated sulphuric acid, which may be collected after cooling, in a storage tank 13. On leaving the absorption tower 7 the gases have usually been cooled so far as to save special cooling, but, if necessary, this may be effected simultaneously with the oxidation to nitrogen dioxid now following. The gases are passed into an oxidation chamber 8, which is favourably fed with a little water or steam or dilute sulphuric acid, oxygen containing gases being added, if necessary, by a pipe 14. The nitrogen dioxid formed is washed out from the gases by passing them successively through towers 9 and 10 in counter-current with concentrated sulphuric acid which is fed from tank 13 to the top of the tower 10, where it is partly converted into nitrosylsulphuric acid, leaves the said tower at the bottom and is supplied through the receiver 15 and pump 16 to the top of the tower 9 from which nitrosylsulphuric acid is drawn at the bottom and collected in tank 17. The said acid may then serve for supply to the first tower 7 by means of pump 12 and pipe 11. The rest of the nitrosylsulphuric acid collected in tank 17 is passed to a decomposer 18 in which it is decomposed by the action of heat and from which pure concentrated sulphuric acid is drawn off and passed to the storage tank 13. The nitrogen oxids flowing in high concentration from the decomposer 18 are converted into nitric acid or nitrates in towers 19, 20 and 21, the first two being fed in counterflow with dilute nitric acid running off from tower 20 into a tank 22 and pumped to the top of tower 19 by means of a pump 23, concentrated nitric acid running off from the tower 19 into a storage tank 24. By washing out the last traces of nitrogen oxids from the gases in tower 21 by means of alkaline solutions which may be collected in a tank 25, nitrates are obtained.

The decomposer 18 is preferably constructed as a column provided with a set of ring pairs. As shown in vertical section in Fig. III, each ring pair consists of an outer ring 26 having a conical bottom 27 with a hole 28 at the centre. The wall 26 of each outer ring is in close proximity to the externally heated wall 29 of the decomposer. Within each outer ring is concentrically arranged an inner ring 30 provided with a conical top cover 31 having a hole 32 of smaller diameter than the holes 28 of the outer rings. The nitrosylsulphuric acid to be decomposed flows through the decomposer from above, collects on the bottom 27 of an outer ring at 33, then flows through the hole 28 into the inclined cover 31 of the next inner ring 30 and collects at 33 on the next outer ring, and so forth. The tube 29 is externally heated so that heat transmission to the nitrolysulphuric acid is easily effected and the acid decomposed thereby, so that sulphuric acid is drawn at the bottom and nitrogen oxids pass through the holes 32 and 28 and leave the column at the top.

*Example 2*

Washing liquors from purifying gas mixtures obtained by dry distillation of coal are heated with direct steam and the mixture of gases obtained containing about 40 per cent of ammonia, 15 per cent of hydrogen sulphid and 5 per cent of cyanogen compounds in mixture with 40 per cent of water vapour is mixed with one and a half its volume of gases containing oxygen such as air. The mixture is then preheated to about 250° C. by the hot gases flowing from a combustion chamber 34 (see Fig. I) and passed over a catalyst 35 consisting of 2 parts of a mixture of 80 per cent of nickel, 15 per cent of iron and 5 per cent of copper, pasted, mixed with 3 parts of fireclay, and calcined, the evaporator 1 and the reaction chamber 3 being shut off by valves 40 and 41. By means of the catalyst the hydrogen sulphid is oxidized into sulphur dioxid and trioxid and the cyanogen compounds are split into ammonia and carbon dioxid. From the flowing gases comprising ammonia and sulphur dioxid and trioxid, ammonium sulphite may be separated by cooling and may be treated again according to Example 1, or the hot mixture of gases may be mixed (at 37), per each volume of ammonia, with 6 volumes of air preheated to about 400° C. for example by the reaction heat of the combustion of ammonia supplied by a pipe 39. This mixture is now passed over the catalyst 36 at about 700° C. and, after passing the catalyst, consists of nitrogen dioxid, sulphur dioxid and trioxid. In order to completely oxidize the sulphur dioxid, the gases are passed at about 500° C. over a catalyst 38 consisting of iron oxids, are then cooled to about 50° C. and passed through the tower 7, Fig. II, which is fed from the top with about 80 per cent sulphuric acid, sulphur trioxid and nitrogen dioxid being dissolved as sulphuric and nitric acid respectively. The escaping gases containing remainders of nitrogen oxid are mixed with air, converting the nitrogen oxid into dioxid, by passing the mixture through tower 8 by means of pipe 14. Nitric acid and its salts are obtained as described in Example 1.

What I claim is:

1. A process for the simultaneous production of nitric acid and sulphuric acid which comprises treating a gas mixture containing ammonia and volatile sulphur compounds in mixture with gases containing oxygen with the aid of oxidizing catalysts, converting the oxidation products into sulphuric and nitrosylsulphuric acid and decomposing the latter into nitric and sulphuric acid.

2. A process for the simultaneous production of nitric acid and sulphuric acid which comprises treating a gas mixture containing ammonia and volatile sulphur compounds with gases containing oxygen with the aid of an oxidizing catalyst so as to convert the sulphur compounds into oxids of sulphur and cyanogen compounds, if such be present, into ammonia and oxids of carbon, catalytically oxidizing the ammonia and converting the oxidation products into sulphuric and nitrosylsulphuric acid and decomposing the latter into nitric and sulphuric acid.

3. A process for the simultaneous production of nitric acid and sulphuric acid which comprises treating a gas mixture containing ammonia and volatile sulphur compounds obtained by the decomposition of purifying media from the production of industrial gases with gases containing oxygen with the aid of an oxidizing catalyst, converting the oxidation products into sulfuric and nitrosylsulphuric acid and decomposing the latter into nitric and sulphuric acid.

4. A process for the simultaneous production of nitric acid and sulphuric acid which comprises treating a gas mixture containing ammonia and volatile sulphur compounds obtained by the decomposition of ammonium salts of the oxygen containing acids of sulphur, with gases containing oxygen with the aid of an oxidizing catalyst, converting the oxidation products into sulphuric and nitrosylsulphuric acid and decomposing the latter into nitric and sulphuric acid.

5. A process for the simultaneous production of nitric acid and sulphuric acid which comprises treating a gas mixture containing ammonia and sulphurous acid obtained by the decomposition of ammonium sulphite, with gases containing oxygen with the aid of an oxidizing catalyst, converting the oxidation products into sulphuric and nitrosylsulphuric acid and decomposing the latter into nitric and sulphuric acid.

6. A process for the simultaneous production of nitric acid and sulphuric acid which comprises treating a gas mixture containing ammonia and volatile sulphur compounds in mixture with gases containing oxygen with the aid of an oxidizing catalyst so as to produce a mixture comprising nitrogen oxids and sulphur dioxid, catalytically oxidizing the sulphur dioxid to sulphur trioxid, converting the oxidation products into sulphuric and nitrosylsulphuric acid and decomposing the latter into nitric and sulphuric acid.

7. A process for the simultaneous production of nitric acid and sulphuric acid which comprises treating a gas mixture containing ammonia and volatile sulphur compounds in mixture with gases containing oxygen with the aid of an oxidizing catalyst, scrubbing the resulting hot gases with nitrosylsulphuric acid, oxidizing the remaining nitrogen oxids, absorbing them by means of sulphuric acid, decomposing the resulting nitrosylsulphuric acid into sulphuric acid and nitrogen oxids and converting the latter into nitric acid.

In testimony whereof I have hereunto set my hand.

HANS BÄHR.